Patented July 7, 1942

2,288,873

UNITED STATES PATENT OFFICE 2,288,873

POLYMERIZATION OF OLEFINS

Edmond L. d'Ouville, Chicago, Ill., assignor to Standard Oil Company, Chicago, Ill., a corporation of Indiana No Drawing. Application December 30, 1939, Serial No. 311,948

13 Claims. (Cl. 196—10)

This invention relates to the catalytic conversion of hydrocarbons. More particularly, it relates to the catalytic polymerization of normally gaseous hydrocarbons to normally liquid hydrocarbons. Still more particularly, it relates to the use of an improved catalyst for the polymerization of normally gaseous hydrocarbons.

It is well known to polymerize normally gaseous hydrocarbons to normally liquid hydrocarbons of the motor fuel boiling range at elevated temperatures and pressures, with or without catalysts. The thermal process requires rather high temperatures and pressures and does not produce particularly good yields of products. The catalytic processes, while not requiring such high temperatures and pressures, do not give especially good yields of products either over-all or per pass. In addition, many of the catalysts used in such processes are rather expensive.

It is therefore, an object of the present invention to provide an improved process for catalytically polymerizing normally gaseous hydrocarbons to normally liquid hydrocarbons especially those of the motor fuel boiling range. A further object is to provide such a process involving the use of a cheaper and more efficient polymerization catalyst. Still another object is to provide a normally gaseous hydrocarbon polymerization process in which the catalyst used has a higher resistance to elevated temperatures occurring during regeneration. A more specific object is to provide an improved process for catalytically polymerizing mixtures comprising $C_3$ and $C_4$ olefins to normally liquid hydrocarbons of the motor fuel boiling range in which a cheaper, more efficient and more rugged polymerization catalyst is employed. Other objects will appear hereinafter.

It has now been found that these objects may be accomplished by polymerizing normally gaseous hydrocarbons in the presence of a catalyst derived by the gelation of blast furnace slag with an acid, preferably a mineral acid such as sulfuric, phosphoric, nitric or hydrochloric.

As disclosed in a copending application of John A. Anderson and Edmond L. d'Ouville, Serial No. 311,947, filed December 30, 1939, in which their preparation is described, these catalysts are preferably prepared from the blast furnace slag obtained from the smelting of hematite ores in conventional steel mill practice. Preferably also, the molten slag from the blast furnace is disintegrated by discharging it into a stream of water and then grinding the resulting slag "sand" to a fine state of subdivision before it is subjected to the acid treatment.

The preferred slag is usually comprised, principally of silica, alumina, magnesia and lime together with a small amount of other materials including iron, maganese, sulfur and phosphorus with a trace of potash and soda. Various other elements may be present in small portions generally up to about 1 or 2% depending upon the character of the ore employed in the smelting operation. A general analysis of blast furnace slag showing the proportions of the principal ingredients follows:

| | Per Cent |
|---|---|
| Silica | 25–40 |
| Alumina | 10–15 |
| Magnesia | 5–25 |
| Lime | 20–50 |

The silica and alumina contents may vary from these figures and silica may reach 55% in some cases. Slag suitable as raw material from which to prepare the catalyst of the present invention may contain as little as 5% or less of alumina.

As indicated above, it is preferable to grind or otherwise reduce the slag to a fine powder before it is brought into contact with the acid in order that it may be more readily attacked by the acid in the disintegration step of the process. Thus the slag may be reduced to about 100 mesh and, in some cases, even to 150 or 300 mesh. "Slag wool" which is a fibrous form of slag, may also be used.

The powdered slag is then treated with a solution of a strong acid, such as hydrochloric, sulfuric, sulfamic, oxalic, phosphoric or nitric acid. If no large particles are present complete solution in acid will take place in a short time. If, on the other hand, large particles are present they may not be completely disintegrated or dissolved and may remain in the finished catalyst product or, if desired, they may be separated in a separate step as hereinafter described. Foreign matter, such as carbon and dirt, will also remain undissolved.

In a typical example, the finely divided slag is treated with hydrochloric acid at a concentration of 15 to 20% HCl, adding one part of slag to about 5 parts by weight of the acid solution. A water slurry of the slag may be added to the acid to obtain more rapid and uniform contact. The treatment may be conducted at ordinary temperature but usually requires cooling to remove the heat of reaction in order to maintain such conditions. In general, however, it is preferable to carry out the treatment at somewhat elevated temperature, for example, 80 to 150° C., and particularly at the boiling point of the acid which, in the case of 17% HCl, is about 110° C. Thus, whereas the treatment may require several hours or days at ordinary temperature, disintegration of the slag may be complete within 5 minutes to an hour at the elevated temperature attained by allowing the reaction to proceed normally without cooling. Boiling also tends to drive off $H_2S$, thus dissolving the sulfur in the catalyst.

By controlling the concentration and the quantity of the acid used, the strength of the catalyst may be improved. In another typical example, 100 g. of powdered blast furnace slag were disintegrated with a solution of 250 ml. 35% hydrochloric acid dissolved in 1700 ml. of water. The yield of catalyst after coagulation, washing and drying was 40 g. If much less acid is used the slag will not be completely disintegrated. If less water is used the slag obtained will have a lower density and will generally be physically weaker. The use of more water increases the cost of evaporation and drying and while the concentration may be increased, for example to 100 g. of slag for 800 ml. of water, in that case it is desirable to let the gelled catalyst age for several hours to several days. When sulfuric acid is used, it has been found that 100 g. of concentrated sulfuric acid diluted to approximately 2 l. is sufficient to disintegrate 100 g. of powdered slag. This ratio of acid to slag will need to be varied somewhat due to differences in compositions of different slags. In general, the amount of acid necessary must be increased in proportion to the lime content of the slag. When phosphoric acid is used, in the proportion of about 200 g. of acid or more to 100 g. of slag, precipitation of calcium phosphate may be largely avoided.

Where the slag is sufficiently finely ground and the proper concentration and amount of acid is used, it will pass completely into solution in the acid giving a colloidal silica sol together with salts of other elements present, such as calcium, magnesium, aluminum, iron, manganese, etc. Thus, in the treatment of blast furnace slag with hydrochloric acid, calcium and aluminum chlorides are present with the silica sol. In the case where, because of insufficient grinding or non-uniformity, some of the slag remains undissolved in the acid, it may be separated from the solution by filtration or decantation. To facilitate this separation, the solution may be stabilized in various ways as by strong cooling or by adding alcohol or other stabilizers. In any case, the solution is allowed to coagulate in the form of a gel. Coagulation may be accelerated by heating, boiling, evaporating, or by adding coagulants such as phosphoric acids or neutralizing agents such as ammonium hydroxide, calcium hydroxide, sodium acetate, sodium silicate, etc. to adjust the hydrogen ion concentration. By carefully controlling the hydrogen ion concentration during gelation a stronger catalyst is obtained. Where a neutralizing agent is used, it is generally desirable to add an amount only sufficient to reduce the acidity without completely neutralizing the acid. Thus the acidity of the disintegrated slag solution may be reduced to a pH of about 1 to 5. When sodium silicate is employed as the neutralizing agent, silica is produced and combines with the catalyst substance from the slag. In some cases it is desirable to carry the neutralization beyond a pH of 5 and thereby precipitate a portion of the basic elements. Thus, sufficient ammonia may be added to cause the precipitation of some aluminum hydroxide and thereby increase the amount of alumina in the coagulated catalyst.

After coagulation the gelatinous mass is broken up and washed with a copious quantity of water to remove excess acid and soluble salts, or the washing step may be deferred until after initially drying or partially drying. After washing, the mass is dried and crushed to the desired size or pelleted or extruded for use in the polymerization process. The catalyst may also be powdered and contacted with the normally gaseous hydrocarbons in suspension. After use the catalyst becomes deactivated chiefly by carbon deposition and it may be reactivated by burning with air or a mixture of air and inert gas, care being taken to prevent too high temperatures from occurring. Generally, the temperature should be kept below about 1100° F. although in some cases temperatures up to 1400° F. may be tolerated without serious damage to catalyst activity.

As indicated hereinabove, various acids may be used for decomposing the blast furnace slag. When sulfuric acid or phosphoric acid is employed, for example, 10 to 25% concentration of sulfuric acid, a major portion of the calcium contained in the slag is converted into the insoluble sulfate or phosphate. It has been found by actual tests in the conversion of hydrocarbon oils that the presence of calcium sulfate in the catalyst may confer certain valuable properties. Thus, it has been found that in some cases the calcium sulfate increases the physical strength of the catalyst and may also increase the catalyst life by inhibiting the deposition of carbon. The amount of calcium sulfate in the catalyst may be controlled by regulating the amount of $H_2SO_4$ used in the disintegration of the slag, completing the disintegration with HCl or other acid.

If it is desired, however, to eliminate the greater part of the calcium sulfate from the catalyst, this may be readily accomplished by filtering or decanting the disintegrated solution obtained from the disintegration of the blast furnace slag before gelation has occurred. The time required for gelation depends on a variety of conditions and will ordinarily be between one hour and one day. Gelation, however, may be inhibited or slowed down in several ways such as by adding alcohol, for example about 5 to 10%, or by cooling the solution thereby facilitating the separation of calcium sulfate and/or other insoluble substances.

The catalyst appears to consist substantially of an extremely active form of silica suitable for olefin polymerization promoted by various substances derived from the slag. If the gelled slag is washed with hot water, the amount of promoter left in the catalyst may be increased, probably because of increased hydrolysis of the salts present. When the acid used in disintegration is a volatile acid, such as HCl or $HNO_3$, the amount of promoter in the catalyst may be increased by drying at a slightly elevated temperature before washing the coagulated catalyst. Drying at 250 to 400° F. is sufficient to drive off the excess acid. Final washing with water then effects a greater hydrolysis of the salts with retention of more promoter by the catalyst.

The silica content of the catalyst is generally high, usually about 80% or 90% or more except in the case where calcium sulfate, barium sulfate or other insoluble salt is present in which case the silica content may be as low as 50% or less as previously indicated. Other catalytically activating elements may be added to the catalyst by adding their salts or oxides to the slag either before or after disintegration. Thus beryllium, uranium, or manganese oxides may be added to the slag in amounts of about .05 to 3% more or less. If an oxide, hydroxide or other insoluble compound of the activating element is employed, it should be thoroughly mixed by grinding. The catalyst material may be further modified by applying to it other catalytic materials after the material has been coagulated and washed, either before or after drying. Thus, solutions of compounds of certain activating metals, such as beryllium chloride, beryllium nitrate, manganese sulfate, potassium permanganate, uranium chloride, uranyl nitrate, aluminum sulfate, etc. may be applied to the coagulated and washed catalyst. The resulting product is then dried and heated to an elevated temperature to decompose the activating metal compounds. The catalyst may also be intimately mixed with oxides, hydroxides, etc. of activating metals, such as aluminum, manganese, uranium, beryllium, etc.

The catalysts derived from blast furnace slag by treatment with acid, as set forth above, are excellent catalysts for the polymerization of normally gaseous hydrocarbons to normally liquid hydrocarbons. They are particularly effective for the polymerization of the $C_3$—$C_4$ olefins but may be used to effect the polymerization of any normally gaseous unsaturated hydrocarbons alone or in a mixture which is, itself, normally gaseous. Such polymerization may be effected at temperatures ranging from about 250° F. up to about 750° F.; preferably the temperature employed will be in the range from about 350° F. to about 650° F. Pressures may range from 15 lb./sq. in. up to 1500 lb./sq. in. or even higher if desired. The preferred range of pressures is from about 200 lbs./sq. in. to about 1500 lb./sq. in. Under these conditions the feed rate should be from about 0.05 to about 10 vol. of liquid feed per hour per gross volume of catalyst and preferably from about .1 to about 5 vol. of liquid feed per hour per volume of catalyst. It will be noted that the conditions specified embrace not only those where the hydrocarbons are in either liquid or vapor phase or partially in one or in the other, but also conditions where the hydrocarbons are in the so-called dense phase lying above the extrapolated vapor pressure curve of the stock. Preferably the polymerization reactions are carried out under these last named conditions, that is, in the dense phase. It is also preferred that combinations of conditions be selected from among those above specified so that maximum yields of hydrocarbons boiling within the gasoline boiling range are produced.

In order that the invention may be better understood, the following example is included. It is intended that this example shall be construed as illustrative only and not as limiting the scope of the invention.

*Example.*—Catalyst was prepared from blast furnace slag by digesting about 100 g. of the pulverized slag in 1 l. of 19% hydrochloric acid for several hours. The digestion mixture was boiled to dissolve any soluble material. Upon dilution with water a white gelatinous material separated from the heavy granular gangue. The gelatinous material was separated by decantation and was washed until free of iron (as shown by the potassium thiocyanate test) and washing continued until there was no free acid in the filtrate. This gelatinous material was then dried at 140° C. over night after which it was broken up and the fines pelleted and added to the finely broken catalyst. There was obtained by this method approximately 20% of solid material based on the weight of the original sample. This catalyst was placed in a catalyst chamber and substantially pure propylene after passing through a wash tower containing moist soda lime was passed into contact with the catalyst in the chamber at a rate of about .42 g. of feed/hour/cc. of catalyst at a pressure of about 200 lb./sq. in. and at a temperature of about 525° F. to 700° F. (The temperature was difficult to control because of the heat evolved). During a five and one-half hour run under these conditions 0.85 g. of polymer per g. of catalyst was produced and the catalyst at the end of the run showed no tendency towards reduction in activity. A yield of 66% by weight of polymer based on the propylene charge was obtained, of which polymer about 91.5% boiled within the gasoline boiling range. When fractionated, about 33% came over at 160° F., 48% at 212° F., 91% at 342° F., and 91.5% at 400° F. The CFR–M octane number of this 400° F. end point product was 82.2.

As may be observed from this example, the catalysts derived from blast furnace slag and employed in the improved polymerization process described herein, are not only cheap but, in addition, possess exceptionally good polymerization activity under moderate conditions and an important advantage is the fact that the polymer products obtained consist, to a large extent, of hydrocarbons boiling within the gasoline boiling range. Other advantages of the invention appear from the above description.

It is apparent that many widely different embodiments of this invention may be made without departing from the spirit and scope thereof and, therefore, it is not intended to be limited except as indicated in the appended claims.

I claim:

1. The process which comprises polymerizing normally gaseous olefinic hydrocarbons to normally liquid hydrocarbons in the presence of a catalyst prepared by subjecting blast furnace slag to the action of an acid until the said slag is substantially dissolved, after which the resulting solution is coagulated and the gel product is washed and dried.

2. A process as described in claim 1 further characterized in that the acid is hydrochloric acid.

3. A process as described in claim 1 further characterized in that the acid is sulfuric acid.

4. A process as described in claim 1 further characterized in that the acid is phosphoric acid.

5. The process which comprises polymerizing normally gaseous olefinic hydrocarbons to normally liquid hydrocarbons by passing said normally gaseous hydrocarbons at a temperature of about 250° F. to about 750° F. in contact with a gel catalyst prepared by subjecting finely divided blast furnace slag to the action of an acid until said slag is substantially dissolved, after which the resulting solution is coagulated and the gel product is washed and dried.

6. The process which comprises polymerizing normally gaseous olefinic hydrocarbons to normally liquid hydrocarbons by passing said normally gaseous hydrocarbons at a temperature of 250° F. to 750° F. in contact with a gel catalyst prepared by the treatment of blast furnace slag with hydrochloric acid until the slag is substantially disintegrated and dissolved by the action of the acid after which the resulting dissolved gel disintegration product is coagulated, washed and dried.

7. A process as described in claim 5 further characterized in that the gel catalyst contains compounds of metals added to the catalyst during its preparation to enhance its catalytic activity.

8. The process which comprises polymerizing normally gaseous olefinic hydrocarbons to normally liquid hydrocarbons by passing said normally gaseous hydrocarbons at a temperature of about 250° F. to about 750° F. in contact with a gel catalyst prepared by subjecting finely divided blast furnace slag to the action of a strong acid until said slag is substantially dissolved, regulating the hydrogen ion concentration of said solution within the range of about pH 1 to about pH 5, allowing the solution to coagulate, washing the coagulated gel product with water until substantially free from soluble ingredients and then drying the product.

9. The process of claim 5 further characterized in that the catalyst used is one prepared by disintegrating the blast furnace slag with an excess of acid beyond that required to neutralize the basic constituents of said slag, then adding a neutralizing agent in an amount sufficient to precipitate a portion of the alumina initially present in said slag.

10. The process of claim 5 further characterized in that the normally gaseous olefinic hydrocarbons undergoing treatment are largely $C_3$ and $C_4$ olefins.

11. The process of claim 5 further characterized in that the polymerization is carried out at a temperature and pressure such that the reacting normally gaseous hydrocarbons are in the dense phase.

12. The process which comprises polymerizing normally gaseous olefinic hydrocarbons to normally liquid hydrocarbons by passing said normally gaseous hydrocarbons at a temperature of about 250° F. to about 750° F. in contact with a gel catalyst prepared by the treatment of blast furnace slag from a hematite ore with a mineral acid until the slag is substantially completely dissolved in the acid, then coagulating the resulting solution and washing and drying the resulting gel product.

13. The process which comprises polymerizing normally gaseous olefinic hydrocarbons to normally liquid hydrocarbons by passing said normally gaseous hydrocarbons at a temperature of about 350° F. to about 650° F., at a pressure of about atmospheric to about 1500 lb./sq. in. and at a flow rate of about 0.05 to 10 vol. of liquid feed per hour per volume of catalyst in contact with a gel catalyst derived from the treatment of blast furnace slag with a strong acid until the slag is substantially disintegrated and dissolved by the action of the acid after which the resulting dissolved gel disintegration product is coagulated, washed and dried.

EDMOND L. D'OUVILLE.